(12) United States Patent
Arakawa et al.

(10) Patent No.: US 6,816,329 B2
(45) Date of Patent: Nov. 9, 2004

(54) DATA REPRODUCING UNIT, DATA REPRODUCING METHOD OF THE SAME, AND A MAGNETIC RECORDING/REPRODUCING APPARATUS

(75) Inventors: Yutaka Arakawa, Tokyo (JP); Akio Mizuno, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 601 days.

(21) Appl. No.: 09/855,799

(22) Filed: May 16, 2001

(65) Prior Publication Data

US 2002/0027731 A1 Mar. 7, 2002

(30) Foreign Application Priority Data

Jul. 19, 2000 (JP) ......................................... 2000-218300

(51) Int. Cl.[7] .................................................. G11B 5/09
(52) U.S. Cl. .............................. 360/53; 360/31; 360/25
(58) Field of Search .............................. 360/25, 31, 53, 360/54, 29, 39, 60, 55

(56) References Cited

U.S. PATENT DOCUMENTS

| | | | | |
|---|---|---|---|---|
| 5,287,363 A | * | 2/1994 | Wolf et al. | 714/718 |
| 6,084,734 A | * | 7/2000 | Southerland et al. | 360/53 |
| 6,147,826 A | * | 11/2000 | Hashimura | 360/53 |
| 6,147,827 A | * | 11/2000 | Southerland et al. | 360/53 |
| 6,523,142 B1 | * | 2/2003 | Igari et al. | 714/55 |

FOREIGN PATENT DOCUMENTS

| | | |
|---|---|---|
| JP | 7-72984 | 3/1995 |
| JP | 11-45158 | 2/1999 |

* cited by examiner

*Primary Examiner*—David Hudspeth
*Assistant Examiner*—Jason Olson
(74) *Attorney, Agent, or Firm*—Finnegan, Henderson, Farabow, Garrett & Dunner, L.L.P.

(57) ABSTRACT

Magnetic recording/reproducing apparatus in which partially-missed data has priority to be transferred to the host system as dummy data over optional data in order to minimize a frame skipping area caused by the dummy data, the dummy data which is used for executing data reproduction having sufficient continuity for a viewer.

29 Claims, 7 Drawing Sheets

DATA REPRODUCING UNIT, DATA REPRODUCING METHOD OF THE SAME, AND A MAGNETIC RECORDING/REPRODUCING APPARATUS

BACKGROUND OF THE INVENTION

1. Field of the Invention

The present invention relates to a magnetic recording/reproducing apparatus, such as a hard disk drive (HDD), and a data output method thereof.

More particularly, the present invention relates to a magnetic recording/reproducing apparatus and a data output method thereof suitable for executing data reproduction having sufficient continuity for a viewer (also referred to as a 'user') even if an error occurs while the apparatus is reading data from a recording medium.

2. Description of the Prior Art

In an information processing system, such as a personal computer, an HDD may be used as an auxiliary storage unit.

In the HDD, during a data recording process, data such as image data and audio data are respectively divided, compressed by coding, and sequentially written into a plurality of different sectors on a magnetic disk unit. On the other hand, during a data reproducing process, the recorded data is sequentially read using ID information (also referred to as 'address information'), which is allocated to each sector on the magnetic disk unit, at the request of the information processing system.

An error may happen to the magnetic disk unit or to the operation environment during the data reproducing process, in which case the HDD cannot recognize the ID information on one sector at least. If the case occurs, the HDD re-executes (hereinafter referred to as 'retries') the data reading from the sectors.

Data recorded on a magnetic disk unit includes both data to be processed by electronic equipment such as a computer, and data to be output to a human, such as audio-visual (AV) data. Certain repeatability is required to the former, while reproduction having sufficient continuity for a viewer is required to the latter.

To the latter, the repeatability on the same level as that required to the former is not always required because of the low analytical capacity of a human, while a delay in data reproduction must be avoided even if part of the data cannot be read normally.

That is, in a case where a host system requests the HDD to read data designated by a user, the HDD must read the data from the magnetic disk unit and transfer it to the host system (hereinafter, referred to as 'host transfer') within a predetermined time. Guaranteeing the rate of host transfer has first priority. Therefore, a limit is placed on a retry count in the reading process.

A command set which specifies the procedure for transferring AV data between the HDD and the host system, such as AV-HDD, is proposed. According to the AV-HDD, the HDD executes the retry in the following cases: (1) where a reading error is detected by the HDD after the end of a reading process or (2) where an error is detected before the start of a reading process owing to miswriting or positioning difficulty owing to head shaking caused by heat or vibration. And even while executing the retry, the HDD stops the retry at the point of time when a processing time designated by the host system elapses.

In order to avoid suspending the operation of the host system, the HDD must transfer any data to the host system even in the case where the retry is stopped as described above. Therefore, the HDD transfers a normal end status (also referred to as a 'no-error status') and dummy data to the host system. That is, the HDD does not inform the host system of the error.

The HDD adopts optionally selected data or predetermined data (hereinafter collectively referred to as 'optional data'), such as '00', as dummy data.

Consequently, the host system can receive some data from the HDD within the designated processing time and execute the data reproduction having sufficient continuity for a viewer.

However, the aforementioned optional data is independent of or remotely related to the data that is to be read originally. As a result, a piece of image data in correspondence to one sector on the magnetic disk unit may be skipped on a display screen owing to a piece of optional data (hereinafter referred to as 'frame skipping') for example.

In the meantime, an error correction code (ECC) error, which is one of the reading errors caused by the HDD, may occur. In this case, data is read from the magnetic disk unit, accompanied by an error or missing portion. And the read data (hereinafter referred to as 'partially-missed data'), which is more useful than optional data as described later, is stored in a buffer RAM inside the HDD.

However, conventionally, partially-missed data is not utilized effectively. Namely, even if an ECC error occurs in a reading process and partially-missed data is stored in the buffer RAM, the HDD does not adopt the partially-missed data as dummy data to minimize frame skipping area on the display screen.

For example, a dynamic image file is stored in several hundreds of sectors per frame, depending on the compression type. As a result, when a plurality of optional data is continuously transferred to the host system, the frame skipping area expands on the display screen and it is extremely hard for a viewer to watch the screen.

SUMMARY OF THE INVENTION

Accordingly, the present invention is directed to a magnetic recording/reproducing apparatus that substantially obviates one or more of problems due to limitations and disadvantages of the prior art.

In accordance with the purpose of the present invention, as embodied and broadly described, the present invention is directed to a data reproducing unit which reads data from are cording medium according to an inputted designation in a reading process and outputs the data within a predetermined time. The data reading unit comprises means for detecting an error which causes in the reading process, a timer for timing the reading process for the data, means for reading the designated data from the recording medium, a memory for storing the data read from the recording medium even though part of the data may be missing, and means for outputting the data stored in the memory within the predetermined time. The reading means re-executes the reading process when an error is detected by the detecting means and stops the re-execution when the predetermined time elapses. And the outputting means outputs the data, part of which is missing, if it is stored in the memory when the re-execution is stopped.

Also in accordance with the present invention, there is provided a data reproducing unit which reads data from a plurality of sectors in a recording medium in each reading process and outputs the data according to an inputted designation within a predetermined time. The data reading unit comprises means for detecting an error which causes in each reading process, means for determining a permissible time for each reading process based on the predetermined time, a timer for timing each process for reading the data from the sector, means for sequentially reading the plurality of data from the sectors, a memory for storing the plurality of data read from the sectors even though part of each read data maybe missing, and means for sequentially outputting data stored in the memory within the predetermined time. The reading means re-executes each reading process when an error is detected in the reading process by the detecting means and stops the re-execution when the permissible time elapses. And the outputting means outputs the data, part of which is missing, if it is stored in the memory when the re-execution is stopped.

Further in accordance with the present invention, there is provided a magnetic recording/reproducing apparatus which transfers data to a host system according to a designation issued by the host system within a predetermined time. The magnetic recording/reproducing apparatus comprises a magnetic disk unit for storing the data in a plurality of sectors, means for detecting an error which causes in each reading process, means for determining a permissible time for each reading process based on the predetermined time, a timer for timing each process for reading the data from the sector, means for sequentially reading the data from the sectors, a memory for storing the data read from the sectors even though part of the read data may be missing, and means for sequentially transferring the data stored in the memory to the host system within the predetermined time. The reading means re-executes each reading process when an error is detected in the reading process by the detecting means and stops the re-execution when the permissible time elapses. And the transferring means transfers the designated data, part of which is missing, if it is stored in the memory when the re-execution is stopped.

Also in accordance with the present invention, there is provided a method for reproducing data from a plurality of sectors in a recording medium and outputting the data according to an inputted designation within a predetermined time. The method comprises sequentially reading the data from the sectors, storing the data read from the sectors in a memory even though part of the read data may be missing, timing each process for reading the data from the sector, outputting the data stored in the memory within the predetermined time, detecting an error which causes in the reading, determining a permissible time for each reading based on the predetermined time, re-executing each reading when the error is detected in the reading, stopping the re-executing when the permissible time elapses, and outputting the data, part of which is missing, if it is stored in the memory when the re-executing is stopped.

BRIEF DESCRIPTION OF THE DRAWINGS

The accompanying drawings, which are incorporated in and constitute part of this specification, illustrate various embodiments and/or features of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings.

FIGS. 1(a) through 1(f) show examples of the screens displaying reproduced images, which is outputted to a viewer from a host system via a display unit when original data is normally read by an HDD. Data read from a sector generally constitutes part of a frame of reproduced image instead of the whole of it, depending on the resolution of the image. In these FIGS. 1(a) through 1(f), the frame is composed of sixteen pieces of data continuing from the upper left of the image down to the lower right along the arrow.

Figure 1A:
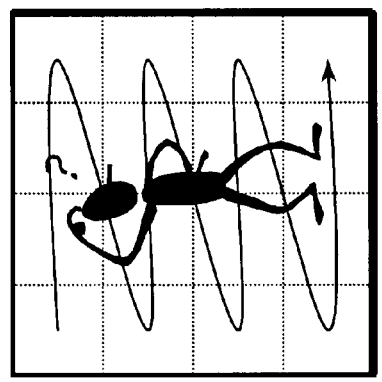
FIGS. 1(a) through 1(f) show examples of the screens displaying reproduced images.
Figure 1B:
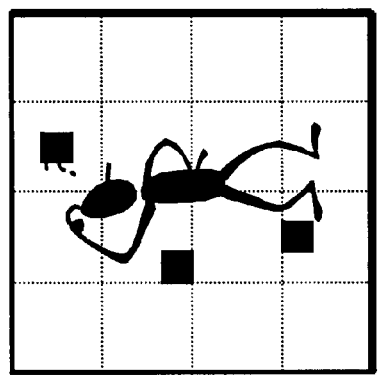
Figure 1C:
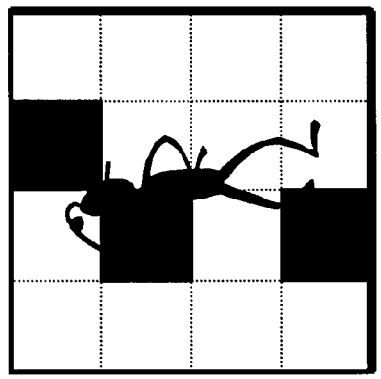

In FIG. 1(b), partially-missed data is adopted as dummy data for the 3rd, 6th, and 14th data respectively, while in FIG. 1(c), optional data is adopted as dummy data for the 3rd, 6th, and 14th data respectively. In FIG. 1(c), the area where the frame skipping occurs is larger and the reproduced image is remarkably harder to watch for a viewer, as compared with FIG. 1(b). It is quite evident that the partially-missed data is more useful than optional data.

Figure 1D:
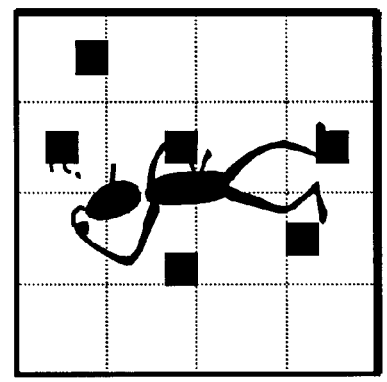
Figure 1E:
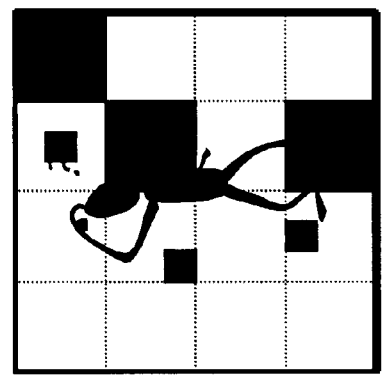
Figure 1F:
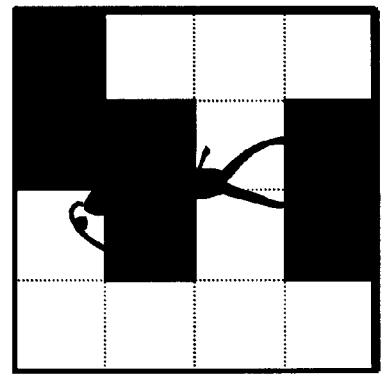

FIGS. 1(d), 1(e), and 1(f) show images reproduced in case that two pieces of dummy data are continuously transferred to the host system. In FIG. 1(d), two pieces of partially-missed data are continuously adopted as dummy data. In FIG. 1(e), a piece of optional data is adopted following apiece of partially-missed data. In FIG. 1(f), two pieces of optional data are continuously adopted.

In the case where partially-missed data are continuously transferred as shown in FIG. 1(d), the proportion of the frame skipping area to the whole image can be smaller as compared with the case as shown in FIG. 1(f) although the frame skipping area in itself expands.

Furthermore, even in the case where partially-missed data and optional data are continuously transferred to the host system as shown in FIG. 1(e), the proportion can be smaller as compared with the case shown in FIG. 1(f).

Therefore, the reduction in the rate of continuous transfer of optional data to the host system, which causes the expansion of the frame skipping area, is required.

Figure 2:
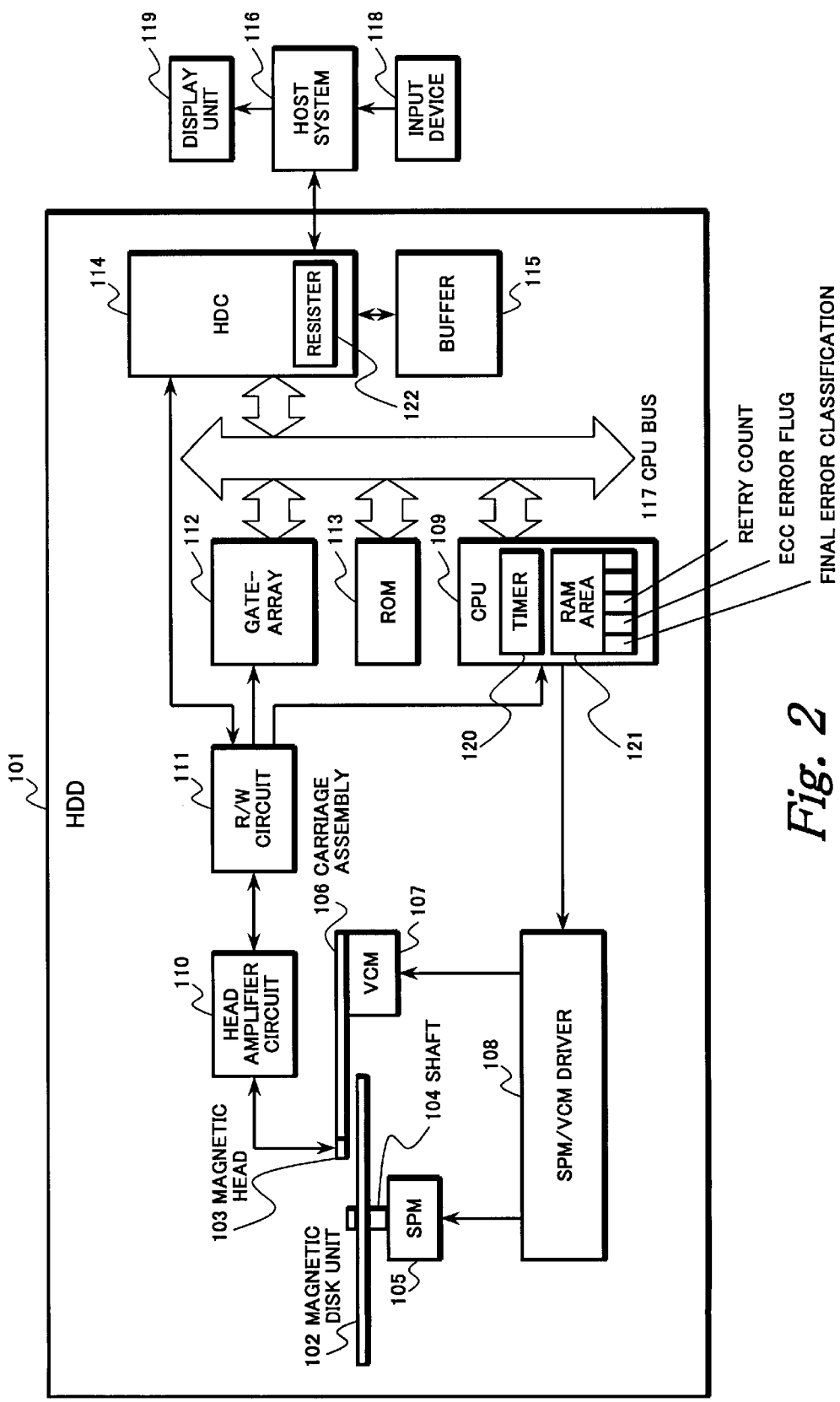
FIG. 2 is a block diagram showing an example of a main configuration of HDD consistent with the present invention.

FIG. 2 is a block diagram showing an example of a main configuration of HDD consistent with the present invention.

An HDD 101 has a circular magnetic disk unit 102 as a recording medium and a magnetic head 103 used to write data on the magnetic disk unit 102 and to read data from the magnetic disk unit 102. In this embodiment, the single magnetic disk unit 102 is mounted in the HDD 101 and the magnetic head 103 is installed only for one side of the disk unit 102. However, a plurality of magnetic disk units can be mounted and a plurality of magnetic heads can be installed for both sides of each magnetic disk unit.

The magnetic disk unit 102 is rotated at high speed during the operation of the HDD 101 by a spindle motor (SPM) 105 that is connected to the magnetic disk unit 102 via a shaft 104. The magnetic head 103 is mounted in a carriage assembly 106 and moved over the magnetic disk unit 102 approximately in its radial direction by the movement of the carriage assembly 106. A voice coil motor (VCM) 107 drives the carriage assembly 106.

The SPM 105 and the VCM 107 are connected to an SPM-VCM driver 108 and respectively driven by control current supplied to each of them from the SPM-VCM driver 108. Each value of these control currents is calculated by a central processing unit (CPU) 109.

The magnetic head 103 is connected to a head amplifier circuit 110 which may be packaged in a flexible print wiring board (FPC). The head amplifier 110 switches the operational function between reading and writing and controls input/output of read/write signals for the magnetic head 103.

The magnetic head 103 has a head amplifier and a write driver (neither are shown in FIG. 2) The head amplifier such as a preamplifier amplifies a read signal read from the magnetic disk unit 102 by the magnetic head 103. The write driver outputs a write signal to the magnetic head 103 based on data provided from a read/write circuit (R/W circuit) 111.

The R/W circuit 111 has a decoding function (also referred to as a 'read channel') for performing signal processing necessary for the data reproducing process and an encoding function (also referred to as a 'write channel') for performing signal processing necessary for the data recording process.

The gate-array 112 transfers information among the R/W circuit 111, a hard disk controller (HDC) 114, and the CPU 109. The gate-array 112 also judges the validity of a servo address read as a read signal.

The CPU 109 is connected to a read only memory (ROM) 113 storing the control program such as firmware for controlling the whole HDD 101. The CPU 109 controls each internal unit according to this control program. The CPU 109 internally has a timer 120 and a random access memory (RAM) area 121 for preserving a retry count, an ECC error flag, and a final error classification, namely, a classification of an error which occurred latest in a reading process for a previous data sector.

The HDC 114 has a host interface function for controlling communication of commands and data between the HDC 114 and a host system 116 according to the interface standard of the host system 116. The HDC 114 also controls a buffer 115 and the timing for reading and writing data for the magnetic disk unit 102. The HDC 114 has a register 122 for setting the no-error status to be transferred to the host system.

The host system 116 has an input device 118 via which a user input a data reproduction request and a display unit 119 for reproducing a read signal. The host system 116 issues a disk read command instructing the HDD 101 to transfer designated data within a designated processing time. And when receiving the data from the HDD 101, the host system 116 reproduces it via the display unit 119.

The buffer 115 may be a high-speed memory such as a RAM. The buffer 115 temporarily stores, within a predetermined volume, data read from the magnetic disk unit 102 and data to be written into the magnetic disk unit 102 that is transferred from the host system 116. The former data and the latter are respectively transferred to the host system 116 and the R/W circuit 111 by the HDC 114 in order of storage.

The CPU 109, the gate-array 112, the ROM 113, and the HDC 114 are mutually connected via a CPU bus 117 according to the standards of the CPU 109.

Figure 3:
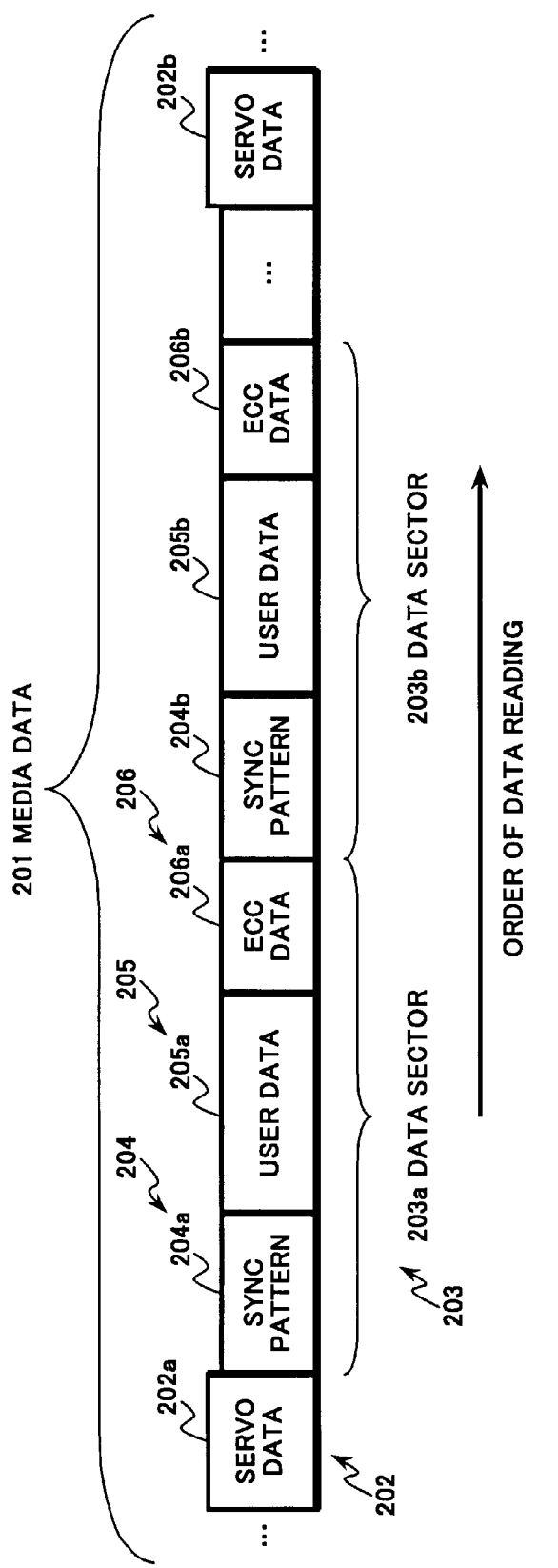
FIG. 3 shows an example of a format of media data recorded on a recording medium.

FIG. 3 shows an example of a format of media data recorded on a recording medium consistent with the present invention.

Many tracks, on each of which media data 201 is recorded, are formed concentrically on the data recording side of the magnetic disk unit 102. The media data 201 comprises a plurality of servo data 202, e.g., 202a, 202b, etc. arranged at regular intervals. Each servo data 202 is composed of servo address and position information (neither are shown in FIG. 3) and used for controlling the position of the magnetic head 103 on the magnetic disk unit 102.

The media data 201 also comprises a plurality of data sectors 203, e.g., 203a, 203b, etc. Each data sector 203 is composed of synchronous (SYNC) pattern 204, e.g., 204a, 204b, etc., user data 205, e.g., 205a, 205b, etc., and ECC data 206, e.g., 206a, 206b, etc., between the servo data 202. The SYNC pattern 204a is data indicating start of the data sector 203a, for example. The user data 205 is substantial data transferred between the HDD 101 and the host system 116. The ECC data 206a is used to compensate for an error that occurs during the data reading process to the user data 205a.

During the data reproduction, the magnetic head 103 reads the media data 201 in the following order, e.g., the servo data 202a, the SYNC pattern 204a, the user data 205a, the ECC data 206a, the SYNC pattern 204b, the user data 205b, the ECC data 206b, . . . , and the servo data 202b.

The servo data 202a read by the magnetic head 103 is separated into servo address and position information by the R/W circuit 111. The servo address is transferred to the gate-array 112 and judged its validity. On the other hand, the position information is transferred to the CPU 109 and used for moving the magnetic head 103 to a target track in order to control the drive of the SPM-VCM driver 108 and to execute an appropriate data reading process.

Each data in the data sectors 203a, 203b, etc. read by the magnetic head 103 is sequentially transferred to the HDC 114 by the R/W circuit 111 in the following order, e.g., the SYNC pattern 204a, the user data 205a, the ECC data 206a, the SYNC pattern 204b, the user data 205b, the ECC data 206b, etc. When detecting the SYNC pattern 204a, the HDC 114 stores the user data 205a in the buffer 115, for example.

The HDC 114 determines whether there is an error in the user data 205a stored in the buffer 115 based on the ECC data 206a, for example. When detecting an error, the HDC 114 executes an error correction based on the ECC data 206a and restores the corrected data in the buffer 115. User data 205 normally read and the corrected user data 205 stored in the buffer 115 are transferred to the host system 116.

Figure 4:
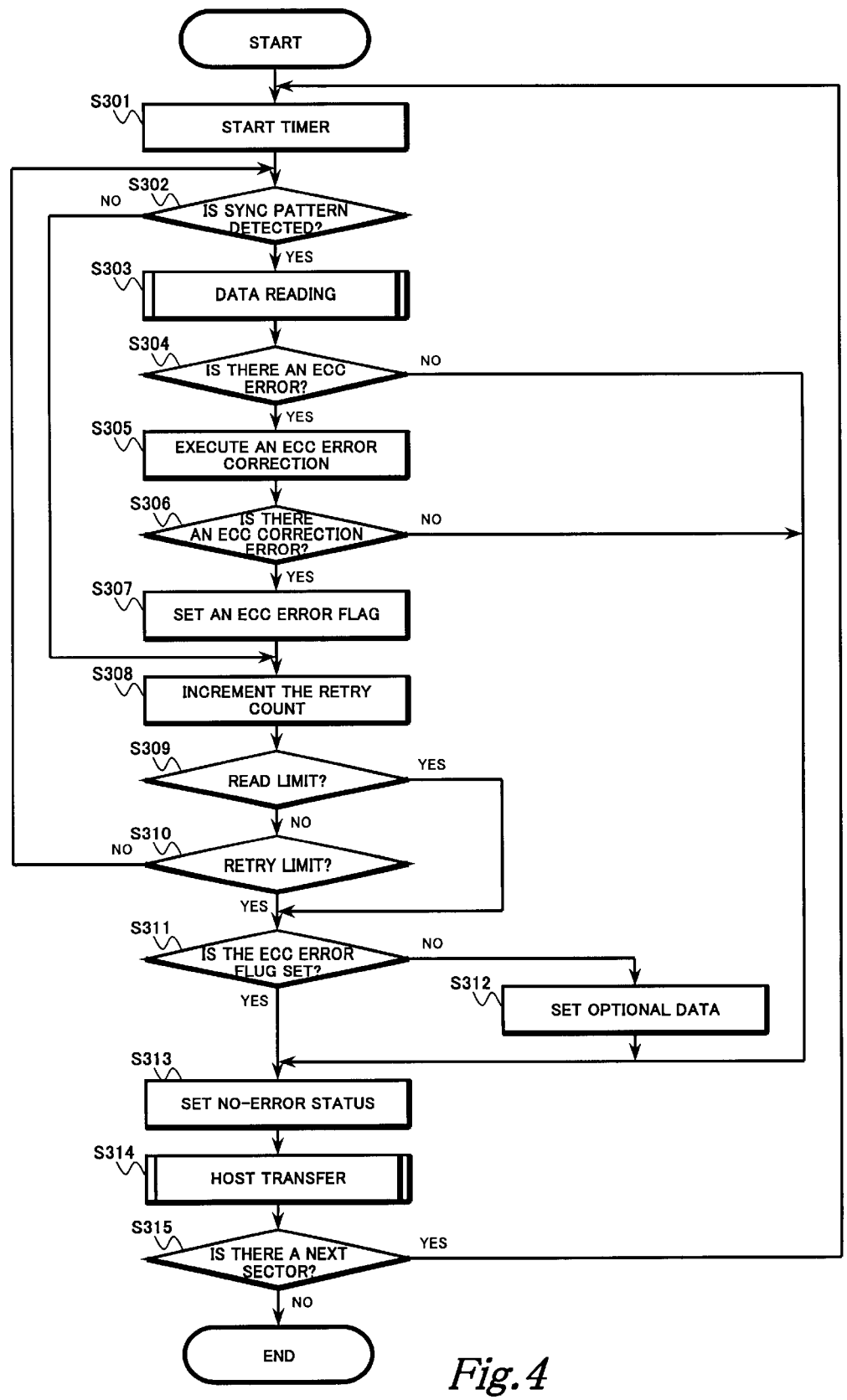
FIG. 4 is a flowchart showing a first example of the data reading process of the HDD consistent with the present invention.

FIG. 4 is a flowchart showing a first example of the data reading process of the HDD consistent with the present invention.

Upon receipt of the disk read command from the host system 116, the HDC 114 starts disk reading according to the received command as follows.

The disk read process explained hereinafter is executed on the assumption that the HDD 101 must transfer data to the host system 116 within a processing time designated by the host system 116. The disk read process is composed of reading data from a designated area (hereinafter referred to as a 'read objective area') on the magnetic disk unit 102 and transferring the data read from the read objective area to the host system 116.

First, the HDC 114 starts the timer 120 in the CPU 109 to terminate each data reading process and transfer dummy data to the host system 116 within the processing time or a time calculated based on the processing time (Step s301).

At the beginning of the data reading process, the CPU 109 moves the magnetic head 103 from a current position onto a track where the read objective area exists. When the magnetic head 103 is positioned on the track, the HDC 114 waits there until the top data sector 203 belonging to the read objective area come by rotation of the magnetic disk unit 102.

The HDC 114 sequentially reads all the data sectors belonging to the read objective area via the head amplifier circuit 110 and the R/W circuit 111. When user data 205 stored in the buffer 115 is normal, the normal user data 205 is transferred to the host system 116 data sector by data sector.

That is, first, the HDC 114 detects the SYNC pattern, which is the top code of the data sector (step S302). When detecting the SYNC pattern 204, the HDC 114 reads the user data 205 following the SYNC pattern 204 and stores it in the buffer 115 (step S303). Moreover, the HDC 114 reads the ECC data 206 and determines whether the user data 205 is normal (step S304) When the user data 205 is not normal, namely, there is an ECC error in the user data 205, the HDC 114 executes an ECC error correction to the failed user data 205 based on the ECC data 206 (step S305).

Next, whether the ECC error correction in itself is normally executed or not is determined (step S306). When there is an error at the step S306, an ECC error flag is set in the RAM area 121 in the CPU 109 (step S307). When the HDC 114 does not detect the SYNC pattern 204 at the step S302 and after the ECC error flag is set at the step S306, the retry count in the RAM area 121 is incremented (step S308).

Furthermore, whether a permissible time (also referred to as a 'read limit') allocated to each data sector 203 is over or not is determined by the timer 120 started at the step S301 (step S309). When the time does not reach the read limit, whether the retry count reaches a predetermined upper limit (hereinafter referred to as a 'retry limit') or not is determined (step S310). When the retry count does not reach the retry limit, the step S302 and the following steps are performed.

When the time reaches the read limit at the step S309 or when the retry count reaches the retry limit at the step S310, whether the ECC error flag is set in the RAM area 121 or not is checked in order to select dummy data for host transfer (step S311).

When the ECC error flag is not set, namely, when an ECC correction error never occur during the retry, optional data such as data of '00' is generated and stored in the buffer 115 (step S312).

Therefore, (1) when no-error occurs at the step S304 or the step S306, data normally read is stored in the buffer 115 data sector by data sector. (2) When an ECC flag is set at the step S311, partially-missed data is stored. And (3) when optional data is set at the step S311, the optional data is stored.

In each case, the HDC 114 sets the no-error status in the register 122 with the data currently stored in the buffer 115 (step S313) and starts executing the host transfer (step S314). Thereafter, the HDC 114 determines whether the next data sector to be read exists in the read objective area (step S315). When the next data sector exists, the step S301 and the following steps are operated. Meanwhile, when the next data sector does not exist, the HDC 114 finishes executing the data reading process.

As described above, according to this exemplary data reading process, even if a read error occurs during a data reading process, partially-missed data is adopted as a dummy data in priority and transferred to the host system 116 after the end of the retry of the reading process. Consequently, the frame skipping area in the display screen, which is caused by dummy data, can be minimized because the rate of transferring optional data is decreased.

Figure 5A:
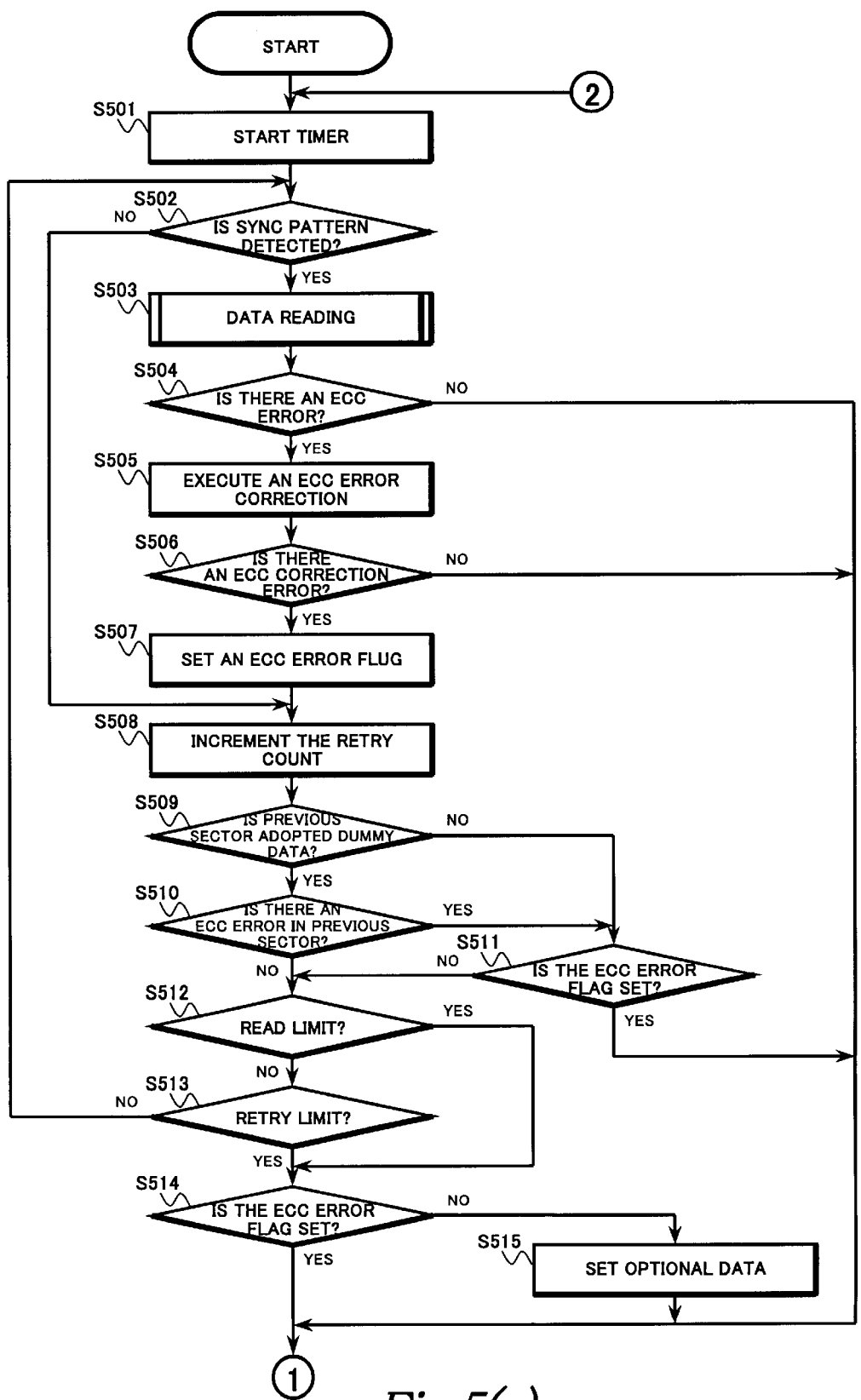
FIGS. 5(a) and 5(b) are flowcharts showing a second example of the data reading process of the HDD consistent with the present invention.
Figure 5B:
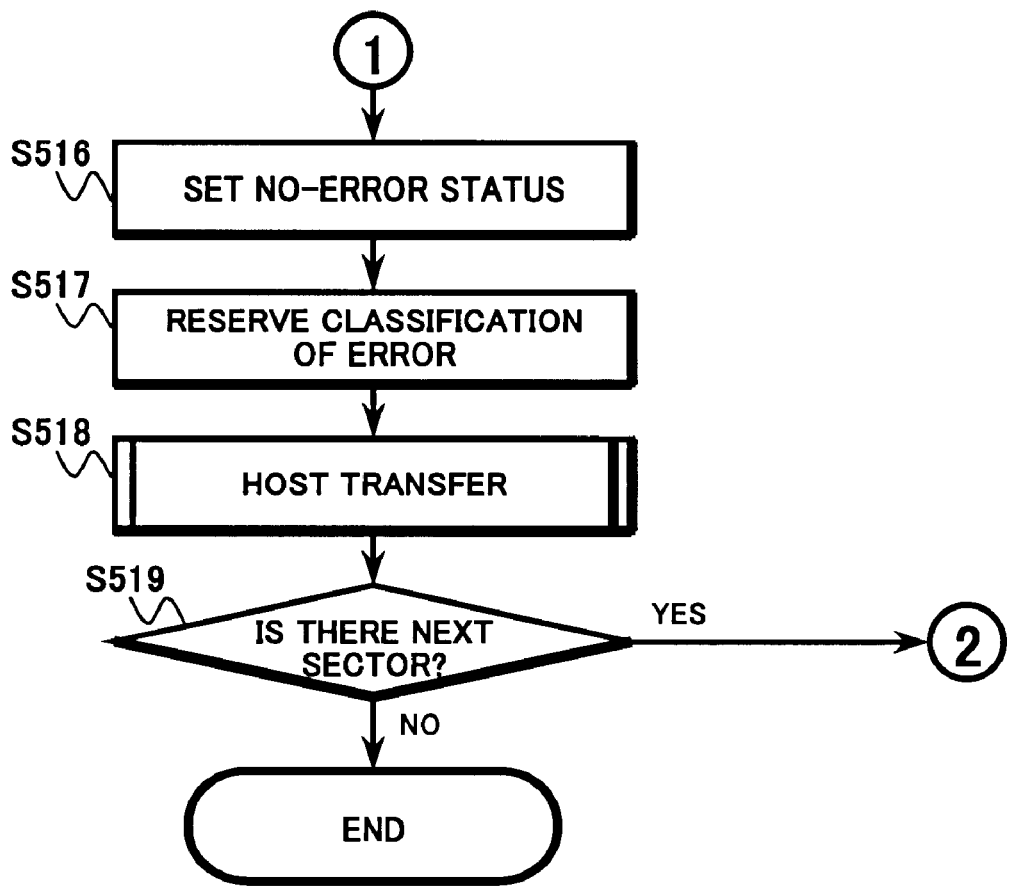

FIGS. 5(a) and 5(b) are flowcharts showing a second example of the data reading process of the HDD consistent with the present invention.

Because the operation at the step S501 through the step S508 is the same as that at the step S301 through the step S308 shown in FIG. 5, the explanation thereof will be omitted hereinafter.

After the retry count of the RAM a real 21 is incremented at the step S508, the HDC 116 determines whether the data transferred to the host system 116 in the reading process corresponding to the previous data sector is normal data or dummy data (step S509) It is assumed that the former includes the case where the previous data sector does not exist because the data sector to be read is positioned at the top of the read objective area.

When the data to be transferred to the host system 116 is dummy data at the step S509, the final error classification preserved in the RAM area 121 in the reading process of the previous data sector is checked (step S510). When the final error classification is other than an ECC error, whether the time reaches the read limit is determined by the timer 120 started at the step S501 (step S512). When the time does not reach the read limit, whether the retry count reaches the retry limit is determined (step S513) Furthermore, when the retry count does not reach the retry limit, the step S502 and the following steps are operated.

When the data to be transferred to the host system 116 is not dummy data in the reading process corresponding to the previous data sector at the step S502 or when the final error classification is an ECC error at the step S510, whether an ECC error flag is set in the RAM area 121 or not is checked (step S511) before the step S512.

When no ECC error flag is set or when the final error classification is not an ECC error at the step S510, whether the time reaches the retry limit is determined at the step S512.

Even when the time reaches the retry limit at the step S511, whether an ECC error flag is set in the RAM area 121 is checked (step S514). When no ECC error flag is set, optional data is generated and stored in the buffer 115 (step S515).

Therefore (1) when no-error occurs at the step S504 or the step S506, data normally read is stored at the step S515 data sector by data sector. (2) When an ECC flag is set at the step S511 or the step S514, partially-missed data is stored. And (3) when optional data is set at the step S515, the optional data is stored.

In each case, the HDC 114 sets the no-error status in the register 122 with the data currently stored in the buffer 115 (step S516), preserves the final error classification in the current reading process in the RAM area 121 (step S517), and then starts executing the host transfer (step S518).

Thereafter, the HDC 114 determines whether the next data sector to be read exists in the read objective area (step S519). When the next data sector exists, the step S502 and the following steps are operated. Meanwhile, when the next data sector does not exist, the HDC 114 finishes executing the data reading process. Although the final error classification is preserved in the RAM area 121 in this embodiment, the existence of an occurrence of an ECC error may be preserved in place of the error classification.

As described above, according to this exemplary data reading process, when the data read in the reading process of the previous data sector is normal data or partially-missed data, moreover, the data read in the current reading process according to the current data sector is partially-missed data, the partially-missed data is adopted as dummy data and transferred to the host system 116. Therefore, there is no need to repeat the retry of the reading process until normal data is read. As a result, the processing time necessary for the reading process of the current data sector can be reduced.

Figure 6A:
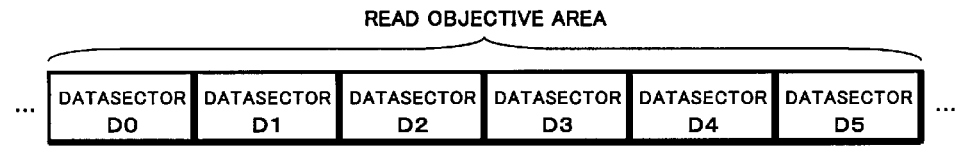
FIGS. 6(a), 6(b), and 6(c) are time charts for explaining a reduction in the time necessary for the data reading process according to the second example.
Figure 6B:
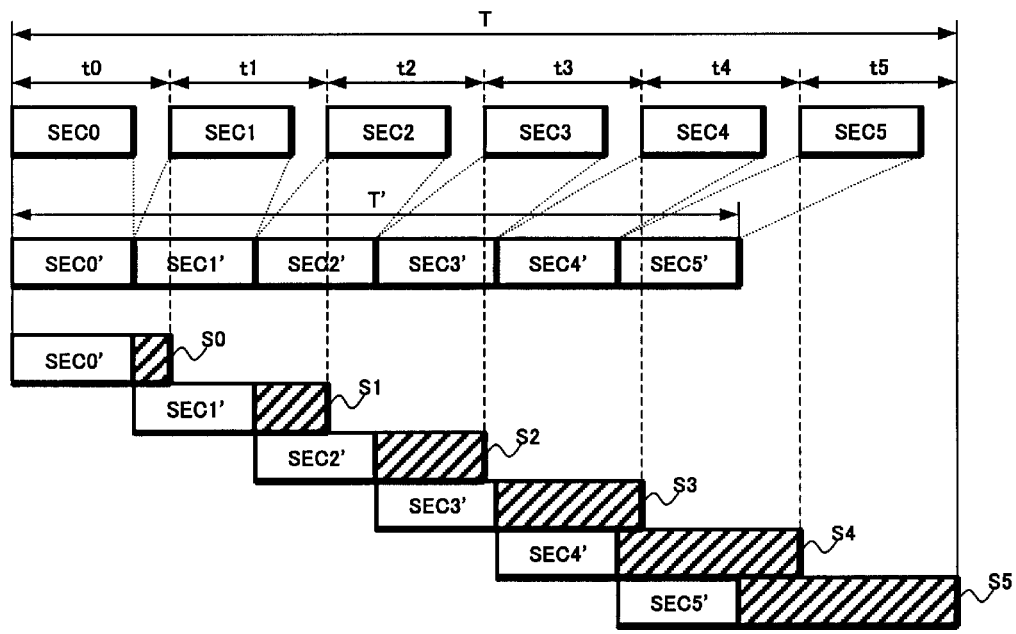
Figure 6C:
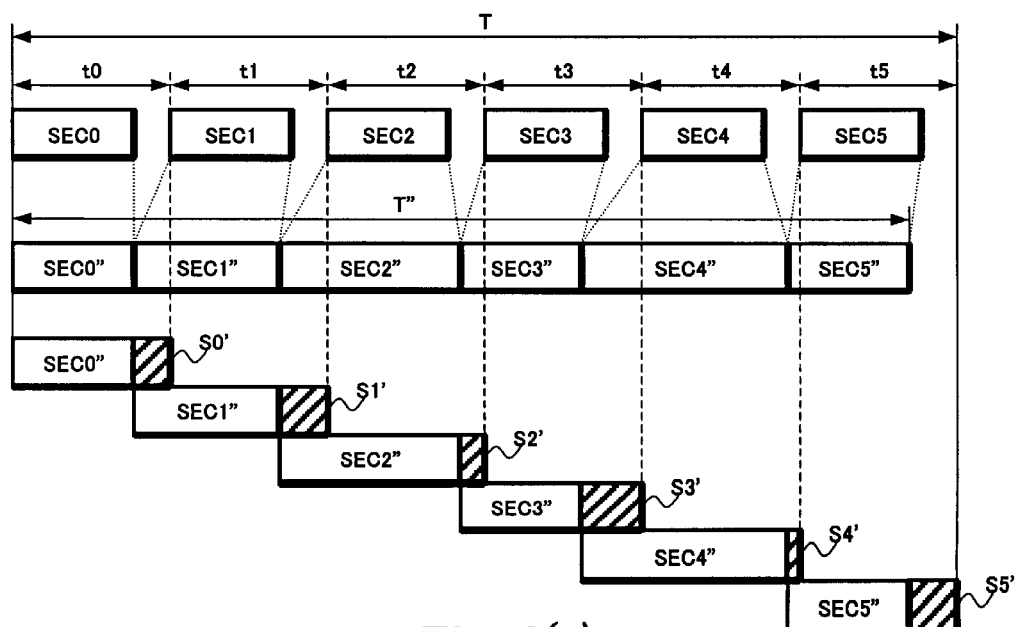

FIGS. 6(a), 6(b), and 6(c) are time charts for explaining a reduction in the time necessary for the data reading process according to the second example.

In FIG. 6(a), six continuous data sectors, e.g., D0 through D5 are included in the read objective area, which is designated by the host system 116 using the read command.

In FIG. 6(b), each of times t0 through t5 indicates a permissible time for a reading process, which is equally allocated to these data sectors D0 through D5 respectively. Each of times t0 through t5 is calculated based on a time T designated for all reading processes by the host system 116.

Each of SEC0 through SEC5 indicates a minimum time necessary for processing each of these data sectors D0 through D5 respectively. Each of these times t0 through t5 may be longer than these processing times SEC0 through SEC5 respectively. Therefore, when all the reading processes are completed without a retry, as shown in FIG. 6(b), each process is executed earlier on the time axis and a total of actual processing times SEC0' through SEC5' comes to a time T'.

The hatched parts S0 through S5 indicate the surplus times accumulated until the ends of these reading processes for these data sectors D0 through D5 respectively. These hatched parts S0 through S5 are usable for these reading processes in addition to these minimum processing times SEC0 through SEC5. After the end of the reading process for the read objective area, the total processing time is finally reduced by S5 (=T−T').

On the other hand, an error may occur in a data reading process. In FIG. 6(c), the reading process of the data sectors D1, D2, and D4 is retried.

Regarding the data sector SEC0, normal data is read in the minimum processing time SEC0" (=SEC0) without a retry. Regarding the data sector SEC1, normal data or partially-missed data is read in an actual processing time SEC1" (>SEC1) after some retries because an error occurs.

Regarding the data sector D2, normal data or partially-missed data is read in an actual processing time SEC2" (>SEC2) after some retries because an error occurs. However, in this case, the actual processing time SEC2" is longer than the permissible time t2.

As mentioned above, according to this embodiment, when some retries are repeated in order not to adopt another optional data as dummy data after adopting optional data in a data reading process for the previous data sector, the same time as of the processing time reduced in the previous reading process can be utilized for the current process retrying. Therefore, the success probability of the retrying process is increased. As a result, the rate of continuous output of optional data, which causes the expansion of frame skipping area, can be reduced.

Hereinbefore the present invention is explained using an HDD. However, neither a type of the recording medium nor a type of the reproducing unit need to be limited to the HDD because the unique characteristic of the present invention is to utilize partially-missed data obtained during the data reading process. That is, the present invention can be applied to any reproducing units or recording/reproducing apparatuses for a data recording media where a reading error may occur, such as a floppy disk, an optical disk (CD-ROM, CD-R, DVD), a photo-electromagnetic disk unit (MO), a semiconductor memory, etc., other than a magnetic disk unit.

As described above, according to the present invention, even when a reading error occurs during a data reading process, partially-missed data is adopted and outputted as dummy data prior to optional data.

Frame skipping area caused by dummy data, which is adopted in order to output data within a predetermined time, is minimized because rate of transferring optional data is decreased. As a result, data reproduction having sufficient continuity for a viewer can be performed.

Other embodiments of the present invention will be apparent to those skilled in the art from consideration of the specification and practice of the invention disclosed herein. It is intended that the specification and examples be considered as exemplary only, with a true scope and spirit of the present invention being indicated by the following claims.

What is claimed is:

1. A data reproducing unit which reads data from a recording medium according to an inputted designation in a reading process and outputs the data within a predetermined time, comprising:

means for detecting an error which causes in the reading process;

a timer for timing the reading process for the data;

means for reading data from the recording medium, the reading means re-executes the reading process when an error is detected by the detecting means and stops the re-execution when the predetermined time elapses;

a memory for storing the data read from the recording medium even though part of the data may be missing; and means for outputting the data stored in the memory within the predetermined time, the outputting means outputs the data, part of which is missing, if it is stored in the memory when the re-execution is stopped.

2. The data reproducing unit of claim 1, wherein the recording medium is a magnetic disk unit.

3. The data reproducing unit of claim 1, wherein the predetermined time is designated by the inputted designation.

4. The data reproducing unit of claim 1, wherein the outputting means outputs the data the moment it is normally stored in the memory.

5. The data reproducing unit of claim 1, wherein:

the memory stores predetermined data; and the outputting means outputs the predetermined data if the data, part of which is missing, is not stored in the memory when the re-execution is stopped.

6. The data reproducing unit of claim 1, further comprising:

means for optionally generating data and storing the generated data in the memory; and the unit wherein:

the outputting means outputs the generated data if the data, part of which is missing, is not stored in the memory when the re-execution is stopped.

7. A data reproducing unit which reads data from a plurality of sectors in a recording medium in each reading process and outputs the data according to an inputted designation within a predetermined time, comprising:

means for detecting an error which causes in each reading process;

means for determining a permissible time for each reading process based on the predetermined time;

a timer for timing each process for reading the data from the sector;

means for sequentially reading the plurality of data from the sectors, the reading means re-executes each reading process when an error is detected in the reading process by the detecting means and stops the re-execution when the permissible time elapses;

a memory for storing the plurality of data read from the sectors even though part of each data may be missing; and means for sequentially outputting data stored in the memory within the predetermined time, the outputting means outputs the data, part of which is missing, if it is stored in the memory when the re-execution is stopped.

8. The data reproducing unit of claim 7, wherein the recording medium is a magnetic disk unit.

9. The data reproducing unit of claim 7, wherein the predetermined time is designated by the inputted designation.

10. The data reading unit of claim 7, wherein the outputting means outputs each data the moment it is normally stored in the memory.

11. The data reproducing unit of claim 7, wherein the outputting means outputs each data stored in the memory within the permissible time.

12. The data reproducing unit of claim 7, wherein:

the memory stores predetermined data; and the outputting means outputs the predetermined data if the data, part of which is missing, is not stored in the memory when the re-execution is stopped.

13. The data reading unit of claim 12, further comprising:

means for recognizing whether the data outputted just before the current reading process is the predetermined data or not; and the unit wherein:

the outputting means outputs the data, part of which is missing, when it is stored in the memory, unless the recognizing means recognizes the outputted data as the predetermined data.

14. The data reproducing unit of claim 7, further comprising:

means for optionally generating data and storing the generated data in the memory; and the unit wherein:

the outputting means outputs the generated data if the data, part of which is missing, is not stored in the memory when the re-execution is stopped.

15. The data reproducing unit of claim 14, further comprising:

means for recognizing whether the data outputted just before the current reading process is the generated data or not; and the unit wherein:

the outputting means outputs the data, part of which is missing, when it is stored in the memory, unless the recognizing means recognizes the outputted data as the generated data.

16. A magnetic recording/reproducing apparatus which transfers data to a host system according to a designation issued by the host system within a predetermined time, comprising:

a magnetic disk unit for storing the data in a plurality of sectors;

means for detecting an error which causes in each reading process;

means for determining a permissible time for each reading process based on the predetermined time;

a timer for timing each process for reading the data from the sector;

means for sequentially reading the data from the sectors, the reading means re-executes each reading process when an error is detected in the reading process by the detecting means and stops the re-execution when the permissible time elapses;

a memory for storing the data read from the sectors even though part of the read data may be missing; and means for sequentially transferring the data stored in the memory to the host system within the predetermined time; the transferring means transfers the data, part of which is missing, if it is stored in the memory when the re-execution is stopped.

17. The magnetic recording/reproducing apparatus of claim 16, wherein the predetermined time is designated by the designation issued by the host system.

18. The magnetic recording/reproducing apparatus of claim 16, wherein the transferring means transfers each data the moment it is normally stored in the memory.

19. The magnetic recording/reproducing apparatus of claim 16, wherein the transferring means transfers each data stored in the memory within the permissible time.

20. The magnetic recording/reproducing apparatus of claim 16, wherein the data includes image data and/or audio data.

21. The magnetic recording/reproducing apparatus of claim 16, wherein:

the memory stores predetermined data; and the transferring means transfers the predetermined data if the data, part of which is missing, is not stored in the memory when the re-execution is stopped.

22. The magnetic recording/reproducing apparatus of claim 21, further comprising:

means for recognizing whether the data transferred just before the current reading process is the predetermined data or not; and the apparatus wherein:

the transferring means transfers the data, part of which is missing, when it is stored in the memory, unless the recognizing means recognized the transferred data as the predetermined data.

23. The magnetic recording/reproducing apparatus of claim 16, further comprising:

means for optionally generating data and storing the generated data in the memory; and the apparatus wherein:

the transferring means transfers the generated data if the data, part of which is missing, is not stored in the memory when the re-execution is stopped.

24. The magnetic recording/reproducing apparatus of claim 23, further comprising:

means for recognizing whether the data transferred just before the current reading process is the generated data or not; and the apparatus wherein:

the transferring means transfers the data, part of which is missing, when it is stored in the memory, unless the recognizing means recognized the transferred data as the generated data.

25. A method for reproducing data from a plurality of sectors in a recording medium and outputting the data according to an inputted designation within a predetermined time, comprising:

sequentially reading the data from the sectors;

storing the data read from the sectors in a memory even though part of the read data may be missing;

timing each process for reading the data from the sector;

outputting the data stored in the memory within the predetermined time;

detecting an error which causes in the reading;

determining a permissible time for each reading based on the predetermined time;

re-executing each reading when the error is detected in the reading;

stopping the re-executing when the permissible time elapses; and outputting the data, part of which is missing, if it is stored in the memory when the re-executing is stopped.

26. The method of claim 25, further comprising:

storing predetermined data in the memory; and outputting the predetermined data if the data, part of which is missing, is not stored in the memory when the re-execution is stopped.

27. The method of claim 26, further comprising:

recognizing whether the data outputted just before the current reading is the predetermined data or not; and outputting the data, part of which is missing, when it is stored in the memory, unless the recognizing means recognizes the outputted data as the predetermined data.

28. The method of claim 27, further comprising:

optionally generating data storing the generated data in the memory; and outputting the generated data if the data, part of which is missing, is not stored in the memory when the re-execution is stopped.

29. The method of claim 28, further comprising:

recognizing whether the data outputted just before the current reading is the generated data or not; and outputting the data, part of which is missing, when it is stored in the memory, unless the recognizing means recognizes the outputted data as the generated data.

* * * * *